(12) United States Patent
Rom et al.

(10) Patent No.: US 7,854,659 B2
(45) Date of Patent: Dec. 21, 2010

(54) JOINT FOR THE TRANSMISSION OF ROTATIONAL MOTION

(75) Inventors: Nissan Rom, Mobile Post Ein Hashofet (IL); Alexandre Khavronine, Afula (IL)

(73) Assignee: Mag-Eh, Ltd., Mobile Post Ein Hashofet (IL)

( * ) Notice: Subject to any disclaimer, the term of this patent is extended or adjusted under 35 U.S.C. 154(b) by 0 days.

(21) Appl. No.: 10/995,879

(22) Filed: Nov. 23, 2004

(65) Prior Publication Data
US 2005/0119057 A1    Jun. 2, 2005

(30) Foreign Application Priority Data
Nov. 27, 2003  (IL) .................................... 159083

(51) Int. Cl.
*F16D 3/18* (2006.01)
(52) U.S. Cl. ...................................... 464/158; 464/106
(58) Field of Classification Search ................ 464/155, 464/156, 149, 106, 145; 81/177.75, 177.8, 81/177.85, 177.7; 403/359.4, 74, 365
See application file for complete search history.

(56) References Cited

U.S. PATENT DOCUMENTS

| 1,111,645 | A | * | 9/1914 | Chadwick ................... 464/158 |
| 3,897,703 | A | * | 8/1975 | Phipps ..................... 81/177.75 |
| 4,188,801 | A | * | 2/1980 | Hugh et al. ................. 464/106 |
| 6,152,826 | A | * | 11/2000 | Profeta et al. ............... 464/159 |
| 6,709,338 | B2 | * | 3/2004 | Weckerling et al. ......... 464/145 |
| 6,869,366 | B2 | * | 3/2005 | Delaney et al. ............. 464/159 |

\* cited by examiner

*Primary Examiner*—Aaron Dunwoody
(74) *Attorney, Agent, or Firm*—Bachman & LaPointe, P.C.

(57) ABSTRACT

The invention provides a joint for the transmission of rotational motion between two rotatable elements, including a first, driven, element consisting of a shaft portion and a head portion, the head portion including a first recess and a second, contiguous, recess in the form of the female partner of a coupling having coupling faces, and a second, driving, element consisting of a shaft portion, a collar portion of a diameter freely fitting into the first recess, and the male partner of the coupling, wherein the respective dimensions of the coupling faces of the male and female partners differ to such an extent that the second element is tiltable out of alignment with the first element while retaining its engagement with the first element.

7 Claims, 4 Drawing Sheets

JOINT FOR THE TRANSMISSION OF ROTATIONAL MOTION

FIELD OF THE INVENTION

The present invention relates to a joint for the transmission of rotational motion between two rotatable shafts.

BACKGROUND OF THE INVENTION

Spare tires for large trucks are heavy and bulky and are usually accommodated below, and secured against, the vehicle body or against a structure carried by elements of the vehicle chassis. Because of their weight and size, vehicle spare tires can rarely be lowered to the ground, nor raised for storage, by hand. For this reason, heavy trucks are provided with hoisting devices, such as hand-operated winches, by means of which these tires are cranked down for use or cranked up for storage.

One difficulty encountered with these hoisting devices resides in the fact that, because of the need for compactness and the cramped location of the spare tires, it was rarely possible to ensure coaxiality for the drive shaft of the hoisting device and the crank handle whereby this shaft is to be rotated to lower or raise the spare tire. As a result, all sorts of connectors, universal joints, etc., had to be resorted to, adding bulky items to the driver's toolbox.

DISCLOSURE OF THE INVENTION

It is therefore one of the objects of the present invention to provide a joint for the transmission of rotational motion between two rotatable shafts that are angularly non-aligned.

In accordance with the invention this is achieved by providing a joint for the transmission of rotational motion between two rotatable elements, comprising a first, driven, element consisting of a shaft portion and a head portion, said head portion including a first recess and a second, contiguous, recess in the form of the female partner of a coupling having coupling faces, and a second, driving, element consisting of a shaft portion, a collar portion of a diameter freely fitting into said first recess, and the male partner of said coupling, wherein the respective dimensions of the coupling faces of said male and female partners differ to such an extent that said second element is tiltable out of alignment with said first element whilst retaining its engagement with said first element.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 represents an exploded view of the joint, according to the present invention;

FIG. 2 is a perspective view of the joint as assembled with the drive shaft and the driven shaft in a position of alignment;

FIG. 3 is an elevational view of the joint in FIG. 2;

FIG. 4 is a view in cross-section along plane IV-IV in FIG. 3;

FIG. 5 is a cross-sectional view of the joint in FIG. 3;

FIG. 6 shows a cross-sectional view of the joint, with the drive shaft in its extreme position of non-alignment;

FIG. 7 represents the joint according to the invention as mounted in a hoisting device;

FIG. 8 is a cross-sectional view of a second embodiment of the joint according to the invention, and FIG. 9 is a perspective view of the joint as assembled.

DETAILED DESCRIPTION OF PREFERRED EMBODIMENTS

Figure 1:
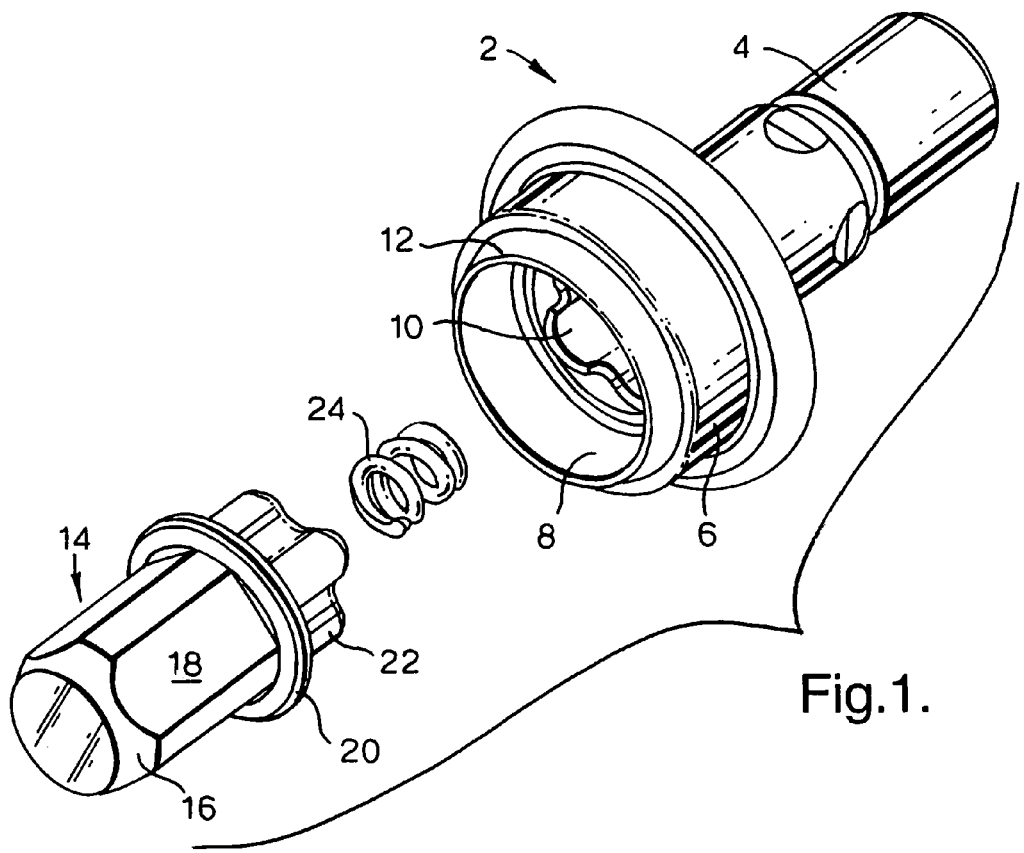

Referring now to the drawings, there is seen in FIG. 1 an exploded view of the joint according to the invention. Shown is the driven element 2 comprised of shaft 4 and head 6. Inside head 6 there is seen a substantially cylindrical recess 8 having a circular cross-section and, contiguous with this recess, the female partner 10 of the coupling constituted by the joint according to the present invention.

Further seen is a member in the form of e.g., a circumferential lip 12, the purpose of which will become apparent further below.

Also seen is the driving element 14 comprised of shaft 16 which has a substantially square cross-section, with four faces 18 engageable by, e.g., the end of a crank handle 19 (FIG. 7), at least the end portion of which is hollow and of a cross-section fitting the cross-section of shaft 16.

Figure 4:
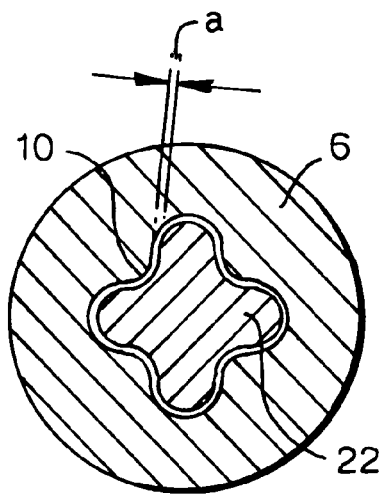
Figure 5:
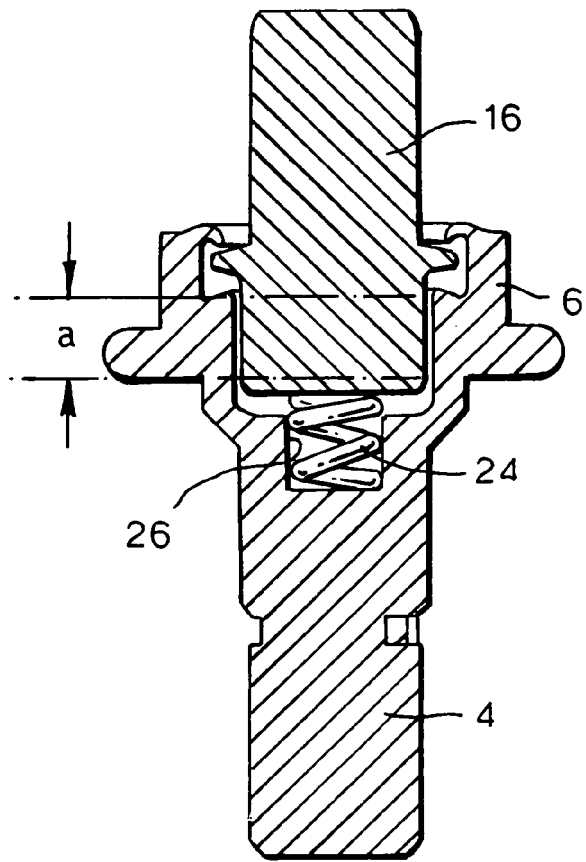
Figure 6:
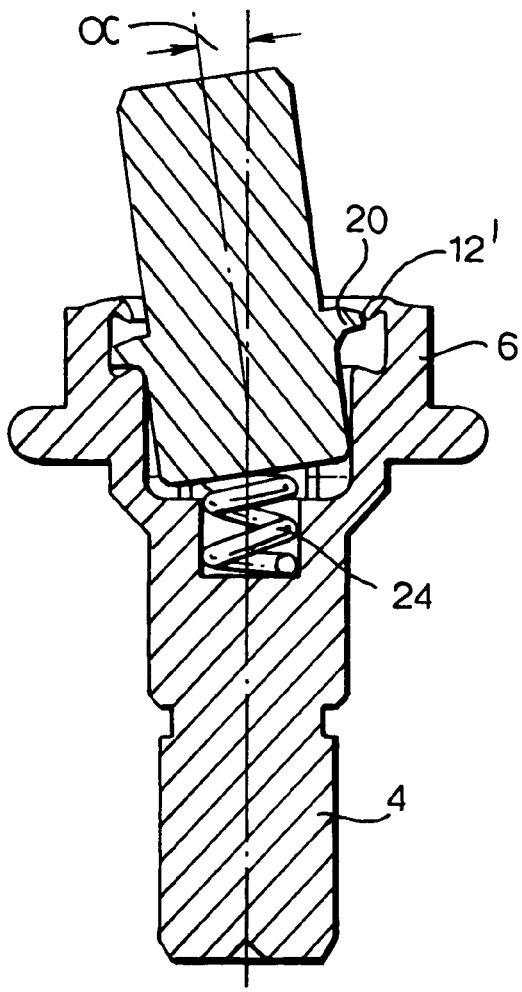

A further part of this element is a circular, ring-shaped collar 20, the purpose of which is to retain element 14 in circular cylindrical recess 8 of head 6 and to delimit the possible tilt of element 14, as clearly seen in FIGS. 5 and 6. Contiguous with collar 20, there is seen the male partner 22 of the coupling. The shape and mutual fitting of these partners are seen to best advantage in FIG. 4.

Further seen is a helical compression spring 24, which is accommodated in a bore 26 (FIG. 5) and extends between the bottom of that bore and the end of male partner 22 while in an already slightly precompressed state. Its purpose is to prevent the generation of noise by the loosely mounted element 14 and to prevent the accumulation of dirt.

Figure 2:
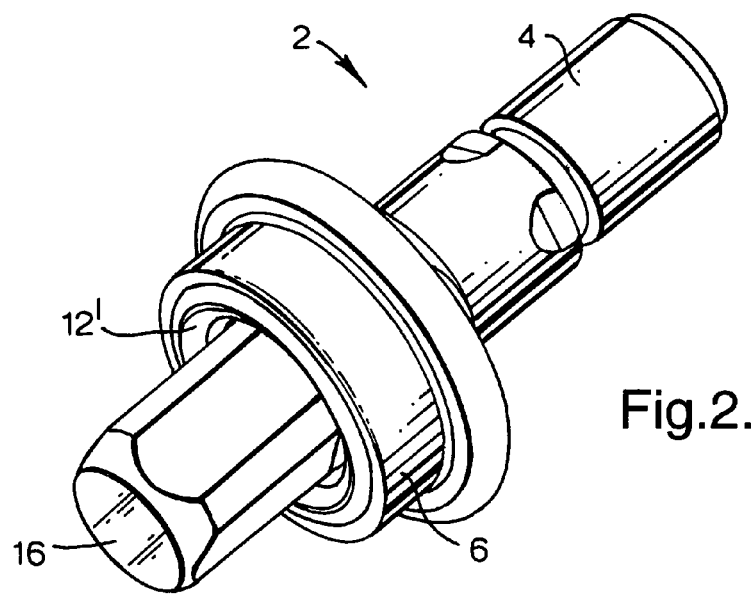

After spring 24 and element 14 have been inserted into element 2, circumferential lip 12, using any of the per se well-known processes, is plastically deformed, being inwards folded, as seen in FIGS. 5 and 6. These drawings also illustrate the cooperation between collar 20 and the folded-in lip 12', also seen in the assembled element 2 of FIG. 2.

Figure 3:
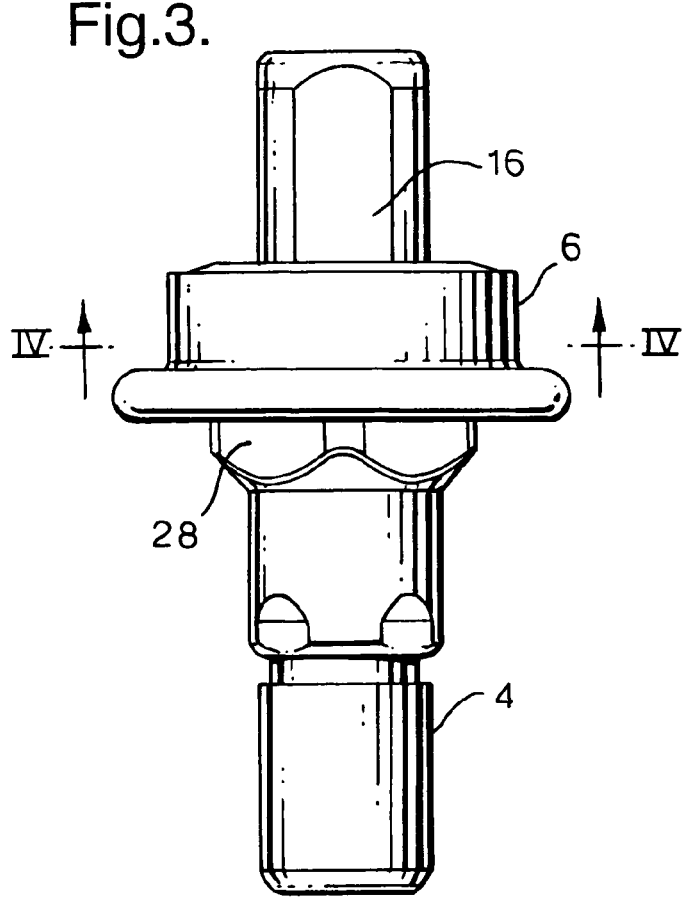

The elevational view of FIG. 3 also indicates a square portion 28 of the element, which serves as positive connection to the mechanism of e.g., a hoisting device.

FIG. 4 clearly indicates the gap $a$ separating head 6 of element 2 in the aligned position of male partner 22, as seen in FIG. 5. The size of gap $a$ determines the maximum angle of tilt $\alpha$, as shown in FIG. 6. Further parameters determining this angle are the location of collar 20 and the degree of folding-in of lip 12.

Clearly seen in FIG. 4 are the respective outlines of male partner 22 and female partner 10, which resemble a cloverleaf having four leaves. It is obviously also possible to use three-leaf shapes.

Figure 7:
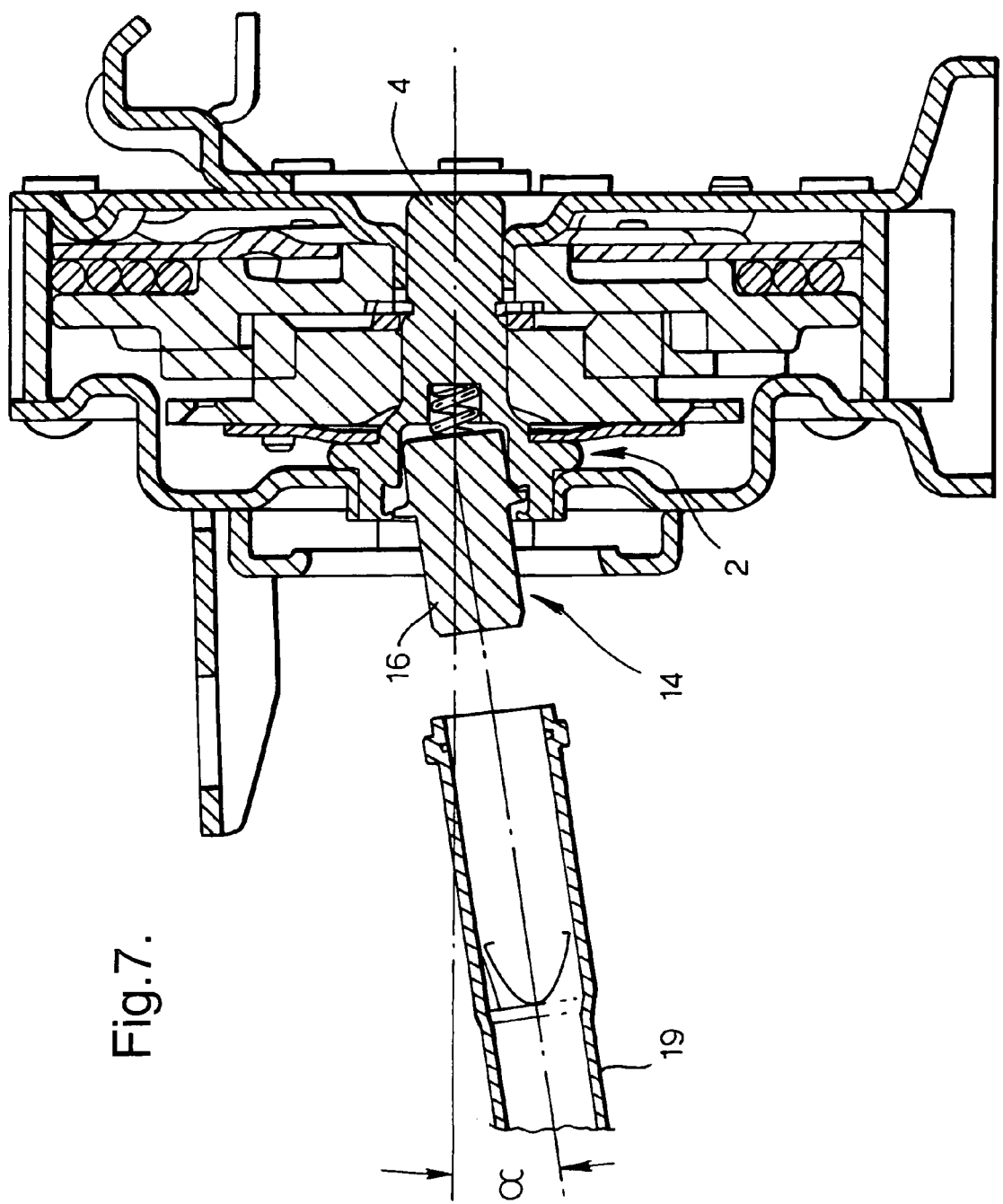

FIG. 7 illustrates the use of the joint according to the invention in a hoisting device, e.g., such as disclosed in U.S. patent application Ser. No. 10/412,809 and included by way of reference. Seen is element 2, as well as element 14, being represented in its extreme angle of non-alignment or tilt which, in a preferred embodiment, is about 7°, while the torque transferable by the joint is at least 50 Nm.

FIG. 7 also shows the end portion of a cranking handle 19 that can be slipped over shaft 16.

Figure 8:
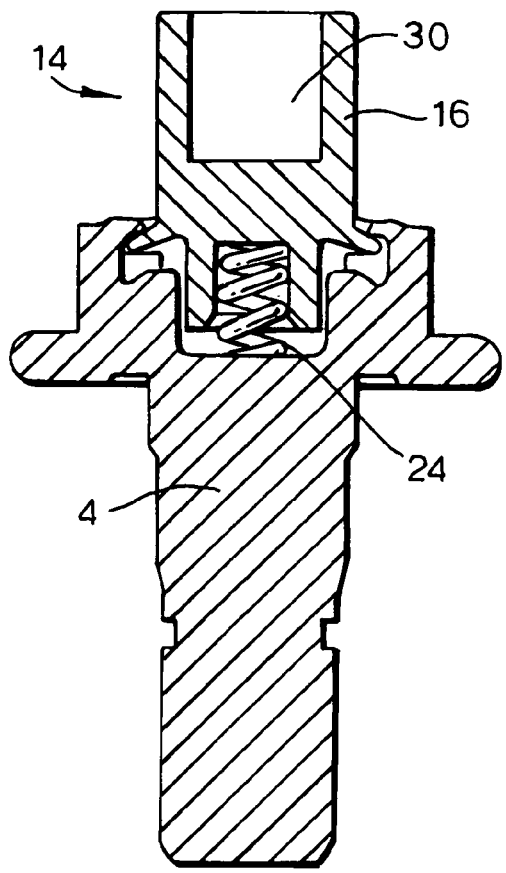

FIG. 8 represents a second embodiment of driving element 14 shown in FIGS. 1 to 7 and comprises a shaft 16 which, in contradistinction to shaft 16 of, e.g., FIG. 1, is preferably cylindrical and without faces 18. Instead, the driving function carried out by faces 18 is fulfilled by a recess 30 of polygonal, preferably rectangular cross-section, seen to better advantage in FIG. 9 in which is adapted to engage an appropriately shaped end portion of handle 19. Obviously, any tool drivingly fitting recess 30 can replace handle 19. It would also be possible to form four faces 18 into shaft 16.

Figure 9:
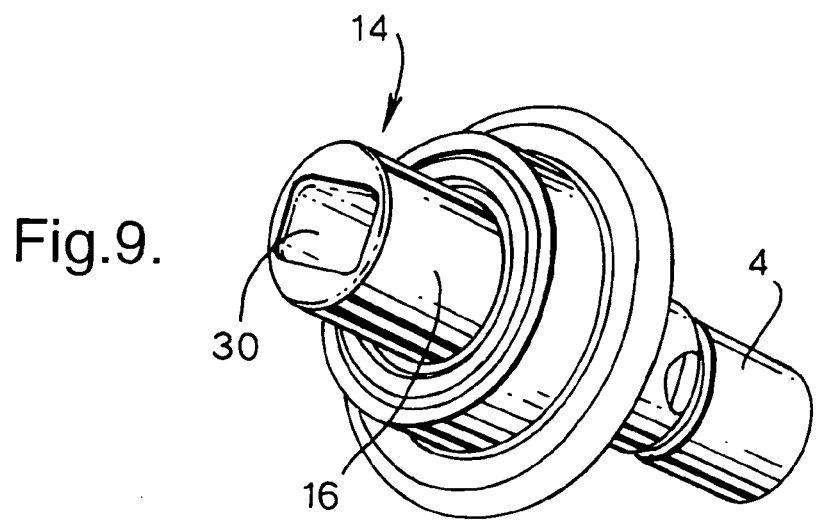

The embodiment of FIGS. 8 and 9 is clearly capable of fulfilling all other functions of the joint according to the invention, particularly the tilting function.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A joint for the transmission of rotational motion between two rotatable elements, comprising:
    a first, single piece driven element consisting of a shaft and a head, said head including a first substantially cylindrical recess having a circular cross-section and a second, contiguous, recess in the form of a female partner of a coupling having coupling faces, the first recess having a larger diameter than the second recess, and
    a second, driving element consisting of a shaft, a collar freely fitted into said first recess, and a male partner of said coupling, said collar extending radially outwardly away from a central axis of the shaft of the driving element;
    wherein
    the driven element further comprises a circumferential lip at the edge of said first recess and extending radially inwardly toward a central axis of the shaft of the driven element and defining an inner diameter smaller than an outer diameter of the collar, thereby preventing in cooperation with said collar, the separation, in the axial direction, of said first and said second elements,
    the driven element further comprises a third recess contiguous with the second recess and opposite to the lip,
    the third recess is smaller than the second recess,
    a spring is disposed between the driven element and the driving element,
    the driven element further comprises a circumferential lip at the edge of said first,
    the respective dimensions of the coupling faces of said male and female partners differ to such an extent that said second driving element is tiltable out of alignment with said first element whilst retaining its engagement with said first element
    outlines of said male and said female partners are substantially of the shape of a cloverleaf with at least three leaves, the male and the female partners having the same number of leaves.

2. The joint as claimed in claim 1, wherein said spring is a helical compression spring.

3. The joint as claimed in claim 1, wherein said shaft of the second, driving, element is provided with a plurality of substantially flat faces.

4. The joint as claimed in claim 1, wherein the shaft of said second, driving, element is provided with a recess of a polygonal cross-section.

5. The joint as claimed in claim 1, wherein said collar is substantially cylindrical, retaining the second driving element in the cylindrical recess, thereby delimiting tilting of said second driving element.

6. The joint as claimed in claim 1, wherein the transmission of rotational motion between said two rotatable elements is effected through the coupling faces of the male and female partners.

7. The joint as claimed in claim 1, wherein the collar comprises a circular, ring-shaped collar.

* * * * *